United States Patent [19]
Miller

[11] 3,920,370
[45] Nov. 18, 1975

[54] APPARATUS FOR FOLDING AN EGG PRODUCT INTO AN OMELET

[75] Inventor: Roland E. Miller, Orangeville, Ill.

[73] Assignee: Kraftco Corporation, Glenview, Ill.

[22] Filed: July 16, 1973

[21] Appl. No.: 379,425

[52] U.S. Cl. .............................................. 425/363
[51] Int. Cl.² ........................................ B29C 17/00
[58] Field of Search ....... 425/363, 337, 364; 270/86

[56] References Cited
UNITED STATES PATENTS

| | | | |
|---|---|---|---|
| 2,725,828 | 12/1955 | Stickelber | 425/363 |
| 2,746,401 | 5/1956 | Archer | 425/337 X |
| 3,115,103 | 12/1963 | Huss | 425/337 X |
| 3,534,953 | 10/1970 | Appleby | 270/86 |
| 3,701,522 | 10/1972 | Chi | 270/86 |

Primary Examiner—Francis S. Husar
Assistant Examiner—David S. Safran
Attorney, Agent, or Firm—Fitch, Even, Tabin & Luedeka

[57] ABSTRACT

Apparatus is disclosed for selectively folding an egg product into the form of an omelet, the apparatus having one or more conveyor belts each of which is adapted to convey a flat pliable egg product along a predetermined path and fold the egg product into the form of an omelet without creating a crease or fracture at the fold.

9 Claims, 4 Drawing Figures

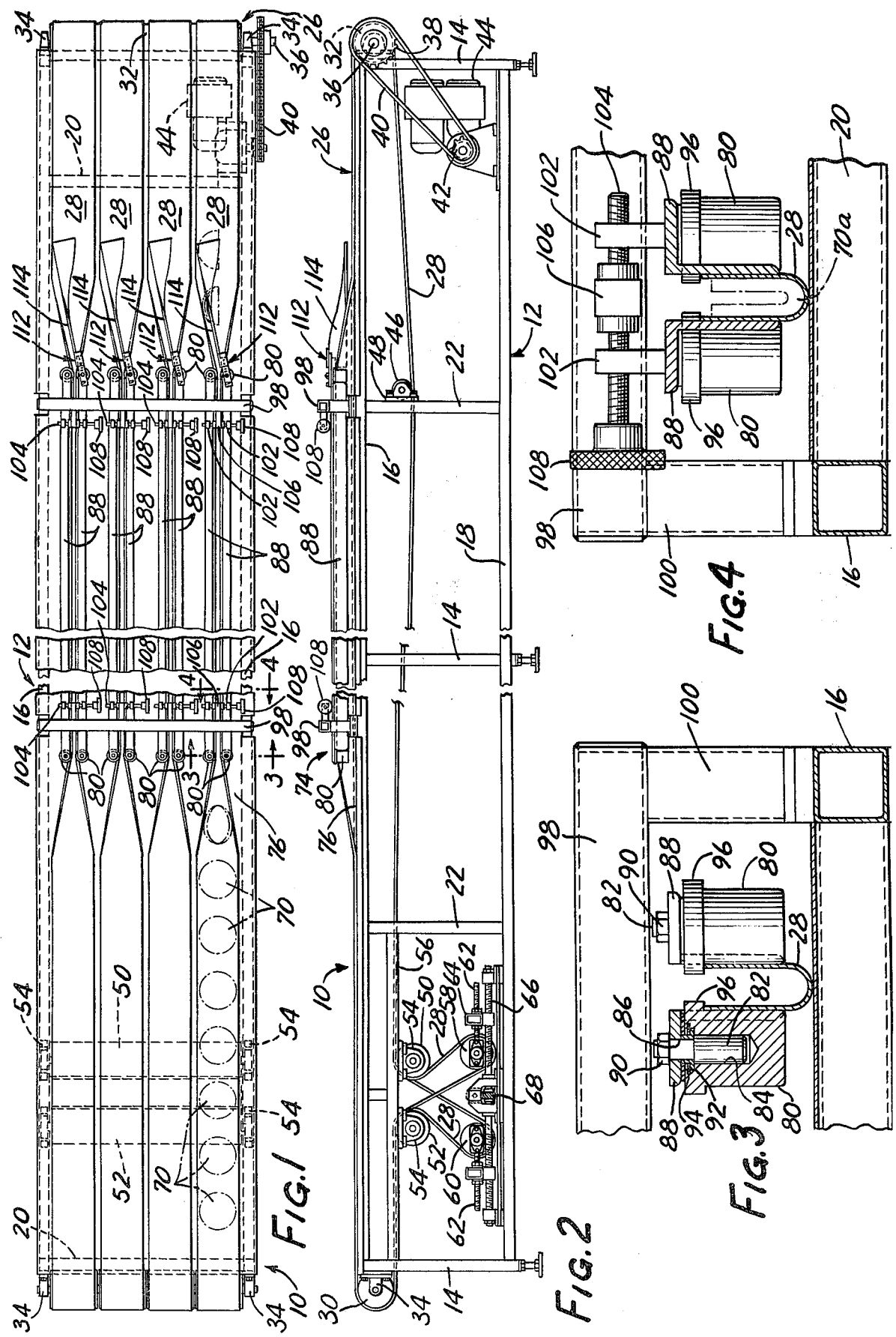

APPARATUS FOR FOLDING AN EGG PRODUCT INTO AN OMELET

The present invention relates generally to food processing apparatus, and more particularly to apparatus for selectively folding an egg product into the form of an omelet without creasing or fracturing the fold portion of the omelet.

A food product of the type with which the present invention finds particular application is disclosed in the copending application of Charles K. Stearns and Andrew D. Singleton, Ser. No. 286,899, filed Sept. 9, 1972, and a continuation-in-part thereof application Ser. No. 450,204, filed Mar. 11, 1974, both assigned to the assignee of the present invention. As therein set forth, the preparation of omelets from whole eggs requires a high degree of culinary skill. The usual methods known to prepare omelets from whole eggs in the home and in restaurants require exacting procedures which are time consuming and do not lend themselves to the preparation of large quantities of omelets, particularly continuous production of large quantities of omelets. As further brought out in the referenced copending application, the preparation of omelets in a manner which allows them to be stored for substantial periods of time prior to consumption requires a rather detailed and exacting procedure.

Briefly, in accordance with the method disclosed in the referenced copending application, egg whites and egg yolks are provided wherein the egg whites and egg yolks are present at substantially the proportions of whole eggs. The egg whites and egg yolks are agitated sufficiently to break the yolks and provide an egg white and egg yolk mix. The moisture of the egg mix is then adjusted to a level from about 75% to about 85% by weight of the egg mix. A predetermined amoount of the egg mix is then placed in heating means, such as a cooking utensil, where the egg mix is heated sufficiently to substantially cook and set the egg mix to provide an egg product in the shape of the cooking utensil. The egg product is then removed from the cooking utensil and the egg product is folded to provide an omelet type egg product which may enfold a filling.

Ideally, the amount of egg mix placed in the heating or cooking utensil is sufficient to cover the bottom of the utensil and provide a depth of egg mix of from about one-eighth inch to about one-half inch within the utensil. The utensil of preferably pre-treated to provide suitable release properties after the egg mix is cooked and set. While the temperature of the utensil at the time of placing the egg mix therein is not critical, the temperature should be maintained below about 200°F. The time required to cook the egg mix is related to the temperature of the egg mix and the temperature of the utensil at the time of placing the egg mix within the utensil. The temperature of the egg mix may be in the range of 80°F. to about 155°F. and the temperature of the utensil may be in the range of from ambient temperature to about 200°F.

In general, it has been found sufficient to heat the egg mix in an oven maintained at a temperature of from about 350°F. to about 475°F. for a period of from about 5 minutes to about 20 minutes so as to set the egg mix without overcooking and drying the egg product that results. Some puffing of the egg mix usually occurs during cooking and the thickness of the egg product after cooking will generally be about one-fourth inch to about three-fourth inch.

After the egg mix has been cooked to provide an egg product, the egg product is removed from the cooking utensil and is thereafter folded in half to provide a traditional half-moon shaped omelet. Because of the unique formulation of the egg product and the manner in which it is cooked, folding of the egg product to provide an omelet must be effected under exacting limitations in order to prevent creasing and cracking or fracturing along the fold portion. Such cracking or fracturing presents an unattractive appearance to the consumer and thereby substantially adversely affects marketability of the omelet.

One of the primary objects of the present invention is to provide apparatus for folding an egg product from a generally flat pliable condition into an omelet configuration without creasing or fracturing the fold portion.

Another object of the present invention is to provide apparatus for selectively folding an egg product into an omelet configuration, which apparatus includes one or more pliable endless belts which are adapted to convey and effect folding of egg products from generally flat pliable conditions into folding omelet configurations without creasing or cracking the fold portions.

Another object of the present invention is to provide apparatus for selectively folding egg products as described wherein the egg products are folded from generally flat pliable conditions into folded omelet configurations while having their lower surfaces continually fully surface supported, the apparatus being adapted to maintain each egg product in a folded omelet condition for a predetermined poeriod of time whereafter the omelet is urged to a position resting on one side thereof preparatory to further processing.

A feature of the present invention lies in the provision of means for adjusting the pliable belt means so as to selectively vary the spacing between opposed side surfaces of the egg products as they are folded into omelet configurations.

A further feature of the present invention lies in the provision of novel means for maintaining one side surface of the folded omelet in continual contact with the conveyor belt as the conveyor belt is returned to a generally flat condition so as to effect movement of the omelet to a position resting on one side surface thereof.

Further objects and advantages of the present invention, together with the organization and manner of operation thereof, will become apparent from the following detailed description of the invention when taken in conjunction with the accompanying drawing wherein like reference numerals designate like elements throughout the several views, and wherein:

FIG. 1 is a foreshortened plan view of an apparatus for selectively folding egg products from generally flat pliable conditions into omelets in accordance with the present invention;

FIG. 2 is a foreshortened side elevational view of the apparatus of FIG. 1;

FIG. 3 is a transverse sectional view taken substantially along the line 3—3 of FIG. 1 and illustrates the manner of supporting a portion of a belt in a generally U-shaped configuration; and FIG. 4 is a transverse sectional view taken substantially along the line 4—4 of FIG. 1 illustrating the adjustment mechanism for adjusting the spacing between the belt guide rollers and guide plates.

Referring now to the drawing, and in particular to FIGS. 1 and 2, an apparatus constructed in accordance with the present invention for selectively folding an egg product from a generally flat pliable condition into an omelet configuration is indicated generally at 10. The apparatus 10 includes base frame means, indicated generally at 12, comprising a plurality of vertical support posts 14 having upper and lower horizontal longitudinally extending frame members 16 and 18, respectively, secured to and between the support posts 14. A plurality of tubular frame members 20 are secured in transverse relation to and between the horizontal frame members 16 and 18 so as to provide a generally rectangularly shaped base frame. A plurality of intermediate vertical frame members 22 may be suitably secured between the upper and lower horizontal frame members 16 and 18 to provide additional structural rigidity for the frame means 12.

The frame means 12 serves to support conveyor means, indicated generally at 26, which includes a plurality of normally flat pliable endless belts 28, there being four such belts employed in the illustrated embodiment of the apparatus 10. Each of the endless belts 28 is identical in construction and is identically operatively supported by the frame means 12. Each of the belts 28 is reeved about a pair of transversely supported rollers 30 and 32 mounted by suitable bearings 34 to the opposite ends of the frame means 12 adjacent the upper horizontal frame members 16. The roller 32 serves as a drive roller for the belts 28 and is fixedly mounted on a support shaft 36 having a drive sprocket 38 secured on one end thereof for driving connection through an endless drive chain 40 and drive sprocket 42 to a variable speed motor drive assembly 44. If desired, a chain guard (not shown) may be provided about the drive chain 40 and associated drive sprockets 38 and 42.

A transverse idler roller 46 is mounted through end bearings 48 to a pair of the vertical intermediate frame members 22 for engagement with the lower reaches of the belts 28 to stabilize the belts during movement. A pair of transversely disposed longitudinally spaced idler rollers 50 and 52 are mounted through suitable support bearings 54 to the lower surfaces of horizontal support channels or angles 56 so that the belts 28 may be partially reeved about the idler rollers 50 and 52. A pair of transversely disposed adjustable belt rollers 58 and 60 are supported by the lower horizontal frame members 18 to generally underlie the idler rollers 50 and 52, respectively. The rollers 58 and 60 serve to provide means for adjusting the tension or slack in the belts 28. To this end, each of the rollers 58 and 60 is supported by a pair of horizontally disposed threaded shafts 62 which are threadedly secured to an associated transverse support bracket 64. The transverse brackets 64 have their opposite ends adjustably supported on a pair of horizontal shafts 66 mounted on opposite sides of the frame means 12, one of the shafts 66 having opposite-hand threads on its opposite ends and being rotatable about its longitudinal axis through a centrally disposed helical gear arrangement 68 to effect simultaneous movement of the idler rollers 58 and 60 in directions serving to slacken or tighten the belts 28. The belts 28 are passed downwardly about the rollers 58 and 60 in alternate fashion such, for example, that the first and third belts, considered from the bottom of FIG. 1, are reeved downwardly about the roller 58 while the second and fourth belts are reeved downwardly about the roller 60.

The conveyor belts 28 each preferably comprises a Voss two-ply Vosstex polyester belt having a three-thirty-two inch thickness, an 8 inch width, and a 44 foot length, with a hycar-PVC top cover and an FS bottom portion. The conveyor belts 28 define predetermined paths along which egg products are caused to travel during a folding operation. To this end, the left-hand ends of the conveyor belts 28, as considered in FIGS. 1 and 2, are adapted to receive egg products, indicated in phantom at 70, thereon when the egg products are in generally flat pliable conditions such as when initially taken from cooking means. The pliable egg products 70 are carried along the paths defined by the conveyor belts 28 from the left-hand ends thereof for a predetermined distance along the longitudinal length of the frame means 12 whereupon they are folded into an omelet configuraion. The egg products 70 generally have circular plan configurations when taken from the cooking means and placed upon the conveyor belts 28. It will, however, be understood that the egg products 70 may take substantially any plane configuration which lends itself to folding into an omelet configuration.

To effect selective folding of the egg products 70 from generally flat pliable conditions as they are moved along the paths defined by the conveyor belts 28, the apparatus 10 includes guide means, indicated generally at 74, cooperative with the conveyor belt means 28 to effect selective folding of the belt means with a corresponding folding of the egg products 70 into egg omelet configurations. To maintain the conveyor belts 28, and thus the egg products 70, in generally flat conditions as they are initially received upon the left-hand end portions of the conveyor belts and moved along a first predetermined longitudinal length of the apparatus 10, the guide means 74 includes a horizontal support plate 76 which is secured to the upper edges of the upper horizontal frame members 16. The support plate 76 extends the full longitudinal length of the frame means 12 from the belt roller 30 to the right-hand drive roller 32.

The guide means 74 further includes pairs of generally cylindrical guide rollers 80 which are supported on vertical axes and serve to engage the longitudinal side surfaces of the conveyor belts 28 and effect upward folding of the belts into generally U-shaped transverse configurations as the belts travel through a second predetermined length of travel along the longitudinal length of the apparatus 10. The guide rollers 80 are preferably mounted for rotation about their vertical longitudinal axes to reduce wear on the conveyor belts 28, but would also effect folding of the belts 28 if nonrotatably mounted.

With reference to FIG. 3, taken in conjunction with FIGS. 1 and 2, the guide rollers 80 are supported in laterally spaced pairs with the axes of each pair of rollers lying in a plane transverse to the longitudinal axis of the frame means 12. Each roller 80 is supported for rotation about a vertically disposed support stud 82 having a cylindrical lower end portion received within an axial bore 84 in the associated roller 80. Each stud 82 has an upper reduced diameter end portion received upwardly through a suitable opening 86 in the horizontal flange of an inverted L-shaped support angle or bracket 88. The support studs 82 are suitably retained within the openings 86 in the support brackets 88 by nuts 90. A spacer sleeve 92 and retainer snap-ring 94 cooperate between each of the rollers 80 and its associated support stud 82 to retain the rollers in assembled relation on the associated support studs. Each of the rollers 80 has an annular flange portion 96 on the upper end thereof which defines a radial shoulder surface with the lower cylindrical portion of the roller, the purpose of which will become more apparent hereinbelow.

Each of the support angle brackets 88 extends longitudinally along the frame means 12 in parallel relation to the longitudinal axis thereof, as illustrated in FIGS. 1 and 2, and, in the illustrated embodiment, has a guide roller 80 supported at each end thereof. It will be understood that one or more guide rollers 80 may be supported along the lengths of the angle brackets 88 intermediate the end rollers 80, as desired.

The support brackets 88 are supported generally adjacent their opposite ends by transversely disposed support members 98 which are supported in upward spaced parallel relation to the plate 76 by vertical members 100 secured to the upper surfaces of the upper horizontal frame members 16. With reference to FIGS 1 and 4, each of the angle support brackets 88 has a pair of longitudinally spaced upstanding support members 102 secured to the upper surface of the horizontal flange thereof, the support members 102 on each pair of brackets 88 being transversely aligned to form pairs of the supports 102. The support members 102 have threaded apertures therethrough such that each pair of transversely alinged support members 102 receives a threaded adjustment screw shaft 104 therethrough. Each of the transverse screw shafts 104 has a non-threaded central portion rotatably supported by a horizontally disposed support member 106 which, in turn, is affixed to an associated one of the transverse support members 98. As illustrated in FIG. 4, the angle support brackets 88 are supported in pairs and are positioned such that the depending leg portions of each pair are in opposed parallel relation and have their inneermost surfaces coincident with a plane tangent to the peripheral surfaces of the lower cylindrical portions of the associated guide rollers 80 thereon. The threaded screw shafts 104 have opposite hand threads on the opposite ends thereof such that rotation of the screw shafts 104 through knurled handles 108 varies the distance between the associated pairs of support angles 88.

With reference to FIGS. 1 and 2, the longitudinal sides of the conveyor belts 28 are folded upwardly about the longitudinal axes of the belts so as to be engaged by the inner opposing surfaces of the associated pairs of guide rollers 80 and the intermediate depending leg portions of the support angles 88 which act as guide plate means. The longitudinal edges of the belts 28 engage the radial shoulder surfaces on the rollers 80 defined between the annular flanges 96 and the lower cylindrical surfaces of the guide rollers. The spaced depending leg portions of the pair of angle supports 88 maintain suface contact with the longitudinal sides of the associated belts 28 as the belts pass between the pairs of guide rollers 80. In this fashion, each of the guide belts 28 is transformed from a generally flat condition to a generally U-shaped configuration as the belt passes between the pairs of rollers 80 and associated angle support brackets 88 for a predetermined length of travel along the longitudinal axis of the apparatus 10.

With reference to FIG. 4, as an egg product 70 is moved along on its associated conveyor belt 28 from a generally flat condition, as in the initial stage of travel along the frame means 12, to a position within the U-shaped belt portion, the egg product is folded into a corresponding U-shaped configuration, all the while having its lower surface fully supported by the associated conveyor belt 28. The pairs of guide rollers 80 and their associated angle brackets 88 may be adjustably spaced laterally apart a distance such that when the associated conveyor belt 28 is folded into a U-shaped configuration as it passes between the guide rollers, the egg products 70 carried by the conveyor belts are folded upwardly about a fold 70a with the opposing upstanding sides of the egg products either spaced apart or in surface contact with each other.

After the conveyor belts 28 pass through the rearward pairs of vertically disposed guide rollers 80, the conveyor belts are returned to their flat conditions upon the rearward or right-hand end of the support plate 76. To prevent the egg products from collapsing or otherwise losing their folded omelet configurations as the omelets leave the rearward pairs of guide rollers 80, biasing means, indicated generally at 112, are provided adjacent the rearward or right-hand guide rollers 80 of each pair of angle brackets 88 to urge each of the folded egg omelet products to a position lying on one of its side surfaces as it is carried along on its associated conveyor belt during return of the conveyor belt to a generally flat condition. Each biasing means 112 includes an elongated guide arm 114 which is connected to the right-hand end of one of the angle brackets 88 of each pair for adjustable movement about a vertical axis. Each of the elongated guide arms 114 is angularly disposed relative to the longitudinal axis of the associated conveyor belt 28, as considered in the plan view of FIG. 1. Each of the support arms 114 has a vertical height sufficient to engage one side surface of a folded egg omelet 70 as it leaves the associated rearward pair of guide rollers 80 in supported relation with the associated conveyor belt 28. The elongated arms 114 are formed such that their surfaces generally parallel the opposing surfaces of the associated conveyor belts 28. The elongated arms 114 provide surfaces along which one side surface of the associated egg omelets slide whereby to urge each egg product in a pivotal position about its fold portion 70a as the opposing side surface of the omelet is maintained in continual full surface contact with the associated conveyor belt 28. As the conveyor belt 28 continues to move rearwardly, the egg omelet is folded onto one side surface thereof by the associated arm 114, with the fold portion 70a of the omelet being maintained in contact with the longitudinal axis of the associated conveyor belt. In this fashion, one side surface of the folded omelet will maintain full surface contact with the conveyor belt, while the opposite side of the omelet overlies the side in contact with the conveyor belt.

It has been found that the temperature of the egg product at the time of folding and the radius maintained at the fold are important to prevent creasing, cracking or fracturing of the egg product at the fold portion. It has been found sufficient to heat the egg mix in an oven maintained at a temperature of from about 350°F. to about 475°F. Preferably, folding of the egg product is caused to take place within about two minutes from the time that the egg product is removed from the heating apparatus. During this time, the egg product retains sufficient heat to permit folding to take place without creasing or fracturing the egg product at the fold. During folding, it is also important that the sides of the egg product be folded so as to create a fold portion having a defined radius or curvature which initially is at least slightly greater than the thickness of the egg product. After the egg product has been folded, it is restrained or maintained in a folded condition for a period of time sufficient to allow the egg product to become relatively less pliable than when it was removed from the cooking means.

It has been found virtually impossible to fold egg products, such as illustrated at 70, by hand in a manner to accomplish the U-shaped fold hereinabove described without creasing or fracturing the egg product at the fold portion 70a. However, by providing full surface support of the egg products 70 as they are folded by the belts 28 of the apparatus 10, and by urging the folded egg omelets to positions to cause each of the folded omelets to rest on one side surface thereof as described, creasing and fracturing of the fold portions 70a is prevented. Additionally by gently urging the folded omelets into positions lying on their side surfaces, collapse of the side portions of the folded egg products is prevented. This serves to further assist in preventing creasing or fracturing of the fold portions 70a of the egg products 70 after they have been folded. When the egg products 70 have passed to the right-hand end of the apparatus 10, they are removed from their associated conveyor belts 28 pursuant to further processing such as in preparation for shipment and storage.

In one embodiment of the apparatus 10 in accordance with the present invention, the conveyor belts 28 were caused to move with a linear velocity of 20 feet per minute. The length of the frame means 12 and the lengths of the conveyor belts 28 disposed above the surface of the support plate 76 were established such that a period of time of 24 seconds elapsed from the time the egg products 70 were disposed on the left-hand ends of the conveyor belts 28 and initially entered the folded U-shaped portions of the conveyor belts to effect folding of the egg products. The lengths of the angle support brackets 88 were established to effect a holding time of 18 seconds during which the folded egg products were maintained in their folded omelet configurations.

The lateral spacing between the pairs of guide rollers 80 may be varied depending upon the nominal vertical thickness of the pliable egg products when taken from their heating means and placed upon the conveyor belts 28. The pairs of rollers 80 may be spaced apart a distance sufficient to effect upward folding of the longitudinal sides of the conveyor belts 28 and thus effect a corresponding folding of the egg products 70 with or without effecting intimate contact of the upwardly folded opposed sides of the egg products. In this fashion, the radii of the fold portions 70a of the egg products may be maintained at a value slightly greater than the thickness of the egg omelet to resist creasing or fracturing of the omelet products.

As the folded egg omelets pass from the U-shaped portions of the conveyor belts 28 and are urged into generally horizontal side relation upon the conveyor belts when the belts are returned to their flat conditions, the biasing means 112 prevents the sides of the folded omelets from separating or collapsing whereby to maintain the desired omelet configuration.

While a preferred embodiment of the apparatus of folding egg products into omelet configurations in accordance with the present invention has been illustrated and described, it will be understood to those skilled in the art that changes and modifications may be made therein without departing from the invention in its broader aspects. Various features of the invention are set forth in the following claims.

I claim:

1. Apparatus for selectively folding an egg product from a generally flat pliable condition into an omelet configuration without creasing or fracturing the fold portion, said apparatus comprising, in combination, frame means, conveyor means including normally flat pliable belt means supported by said frame means and defining a predetermined path along with egg products are caused to travel during a folding operation, said conveyor means having a first end portion adapted to receive an egg product thereon in a generally flat pliable condition, drive means associated with said conveyor means and operative to effect motion of said belt along said path, and guide means cooperative with said conveyor means to maintain said belt means in a generally flat condition and effect movement of a pliable egg product received on said first end portion of said conveyor means along a first predetermined length of said path while in a generally flat condition, said guide means thereafter effecting upward folding of opposite longitudinal sides of said belt means while providing full surface support of said egg product to fold the egg product into a configuration wherein side portions thereof are in side-by-side relation and maintaining said folded condition for a second predetermined length of travel along said path, said guide means thereafter effecting return of said belt means to a generally flat condition along a third predetermined length of said path, and means positioned to cause only one side of the folded egg product to maintain surface contact with said belt means as said egg product passes from said second predetermined length of said path to said third predetermined length of said path and therewith urge the folded egg product to a position lying on one of its sides as it travels along said belt means after return of said belt means to said generally flat condition.

2. An apparatus as defined in claim 1 wherein said guide means includes a first plate portion adapted to underlie said belt means and provide flat support therefor during movement along said first predetermined length of said path, said guide means further including means defining generally vertically disposed surfaces engageable with said longitudinal sides of said belt means to fold said belt means into a generally U-shaped transverse configuration as said belt means passes along said second predetermined length of said path.

3. Apparatus as defined in claim 1 wherein said guide means includes pairs of rollers cooperative with said belt means to effect folding thereof into a generally U-shaped transverse configuration as said belt means passes along said second predetermined length of said path.

4. Apparatus as defined in claim 3 including means supporting said pairs of rollers in a manner to allow adjustment of the distance between the rollers of each pair whereby to vary the distance between the upwardly folded longitudinal sides of said belt means as it passes through said second predetermined length of said path.

5. Apparatus as defined in claim 1 wherein said means positioned to urge the folded egg product to a position lyng on one of its sides includes an arm member extending in the direction of travel of said belt means and angularly disposed relative to the longitudinal axis of said belt means when considered in plan, so as to cause one side of the folded egg product to maintain surface contact with said belt means as said egg product passes from said second predetermined length of said path to said third predetermined length of said path.

6. Apparatus as defined in claim 1 wherein said conveyor means includes a plurality of endless normally flat belts each of which is supported by said frame means for movement along a predetermined path, each of said flat belts being adapted to convey and fold one or more egg products from a generally flat pliable condition into an omelet configuration without creasing or fracturing the egg product along said fold.

7. Apparatus as defined in claim 3 wherein a pair of laterally spaced rollers cooperates with said belt means at the beginning and end of said second predetermined length of path to establish said U-shaped configuration of said belt means, said guide means further including laterally spaced longitudinally extending guide plate means disposed between said pairs of rollers and providing surface contact with and support for said longitudinal sides of said belt means when passing through said second predetermined length of said path.

8. Apparatus as defined in claim 3 wherein said rollers effect equal angular upward folding of said longitudinal sides of said belt within said second predetermined length of said path, when considered relative to the longitudinal axis of said belt means.

9. Apparatus for selectively folding an egg product from a generally flat pliable condition into an omelet configuration without creasing or fracturing the fold portion, said apparatus comprising, in combination, frame means, conveyor means supported by said frame means and defining a path along which one or more egg products may be caused to travel during a folding operation, said conveyor means having a first end portion adapted to receive an egg product thereon in a generally flat pliable condition, drive means associated with said conveyor means and operative to effect motion of said conveyor means along said path, and guide means cooperative with said conveyor means to maintain said conveyor means in a generally flat condition and effect movement of a pliable egg product received on said first end portion of said conveyor means along a first predetermined length of said path while in a generally flat condition, said guide means thereafter establishing a generally U-shaped configuration of said conveyor means as said conveyor means passes through a second predetermined length of said path, said conveyor means providing full surface support of said egg product to fold the egg product into a generally U-shaped configuration wherein side portions thereof are in side-by-side relation and maintain said fold condition during movement of said egg product along said second predetermined length of said path, said guide means thereafter effecting return of said conveyor means to a generally flat condition along a third predetermined length of said path, and means positioned to cause only one side of the folded egg product to maintain surface contact with said conveyor means as said egg product passes from said second predetermined length of said path to said third predetermined length of said path and therewith urge the folded egg product to a position lying on one of its sides as it travels along said path on said conveyor means after return of said conveyor means to said generally flat condition.

* * * * *

UNITED STATES PATENT AND TRADEMARK OFFICE
CERTIFICATE OF CORRECTION

PATENT NO. : 3,920,370
DATED : November 18, 1975
INVENTOR(S) : Roland E. Miller

It is certified that error appears in the above-identified patent and that said Letters Patent are hereby corrected as shown below:

Column 1, line 38, "amoount" should be -- amount --.

Column 1, line 50, "of" should be -- is --.

Column 2, line 24, "folding" should be -- folded.

Column 2, line 34, "poeriod" should be -- period --.

Column 5, line 56, "pair" should be -- pairs --.

Column 5, line 57, "suface" should be -- surface --.

Column 7, line 64, "of" (second occurrence) should be -- for --.

Column 8, line 11 (Claim 1) "with" should be -- which --.

Signed and Sealed this twenty-third Day of March 1976

[SEAL]

Attest:

RUTH C. MASON
*Attesting Officer*

C. MARSHALL DANN
*Commissioner of Patents and Trademarks*